United States Patent [19]
Rostoker et al.

[11] Patent Number: 5,809,243
[45] Date of Patent: Sep. 15, 1998

[54] PERSONAL INTERFACE SYSTEM FOR WIRELESS AND WIRED COMMUNICATIONS

[75] Inventors: Michael D. Rostoker, Boulder Creek; John Daane, Saratoga; Sandeep Jaggi, San Jose, all of Calif.

[73] Assignee: LSI Logi Corporation, Milpitas, Calif.

[21] Appl. No.: 580,540

[22] Filed: Dec. 29, 1995

[51] Int. Cl.$^6$ .................................................. H04Q 7/00
[52] U.S. Cl. .................. 395/200.47; 707/1; 455/472; 340/825.72
[58] Field of Search ............................ 364/514 A, 514 B, 364/514 C, 514 R; 455/3.1, 4.2, 5.1, 33.1, 33.2, 33.3, 422; 370/337, 347, 913; 340/825.72; 395/200.47; 707/1

[56] References Cited

U.S. PATENT DOCUMENTS

| | | | |
|---|---|---|---|
| 5,303,287 | 4/1994 | LaBorde | 379/59 |
| 5,425,032 | 6/1995 | Schloss et al. | 370/95.2 |
| 5,440,336 | 8/1995 | Buhro et la. | 348/13 |
| 5,561,446 | 10/1996 | Montlick | 345/173 |
| 5,613,191 | 3/1997 | Hylton et al. | 455/3.1 |
| 5,619,995 | 4/1997 | Lobodzinski | 128/653.1 |
| 5,630,204 | 5/1997 | Hylton et al. | 455/3.3 |

OTHER PUBLICATIONS

Stuart, "IBM Releases its most Multimedia–Ready Think–Pad", InfoCanada, Nov. 1995.

*Primary Examiner*—James P. Trammell
*Assistant Examiner*—Patrick Assouad
*Attorney, Agent, or Firm*—Oppenheimer Wolff & Donnelly LLP

[57] ABSTRACT

A personal interface system allows a user to access personal records on a database. Each user is provided with a personal interface device. The personal interface device is equipped with wireless and wired communication equipment, allowing a user to access the database anywhere, at any time. A measure of security is provided by a smart card, which must be inserted into the personal interface device.

20 Claims, 2 Drawing Sheets

PERSONAL INTERFACE SYSTEM FOR WIRELESS AND WIRED COMMUNICATIONS

BACKGROUND OF THE INVENTION

The invention relates in general to digital communication systems and in particular to a personal communication system that communicates audio, video and data signals.

Today, wireless data solutions are enabling changes of great scope and depth in our society. Indeed, the wireless information revolution has the potential to democratize the information age like never before. Remotely accessible computers and data systems are becoming more and more available, putting us all on the verge of a world where an unlimited amount of information will be available anywhere, anytime.

Wireless data capabilities are also improving the productivity and accessibility of professionals in the field. The ability to send and receive information over airwaves instead of copper wires is liberating the professionals from their offices, giving them immediate access to databases and streamlining every aspect of their operations. Already, notebook computers equipped with advanced wireless communications software and radio frequency modems have enabled the formation of "virtual offices," offices that are removed from company headquarters. Now, a market analysts can track the stock market in his car while sitting in traffic during his commute to work. An engineer, instead of sitting in his office, can work on a CAD file from the pool side of his home.

The explosion of wireless data communication has been fueled by advances in semiconductor technology and software. These advances have allowed audio and data signals to be transmitted over digital networks in digital language, the language of computers.

Digital and mixed signal systems offer many advantages over old-fashioned analog systems. One important advantage is the ability of digital systems to transmit and receive more information at higher rates. Whereas analog systems are limited to transmitting audio at a rate of 64 Kbps, digital systems can compress audio transmissions and transmit eight times as much information at the same rate. Moreover, faster processors have allowed digital systems to transmit bits at ever increasing rates. By taking advantage of the compression routines and faster processors to transmit information more accurately and at higher rates, significant savings have been realized in both switching capacity and ongoing line costs.

A recent development in the wireless information revolution has been the transmission of video signals over the airwaves. This is now being done in the television industry, as near-perfect images are being transmitted digitally on the Ku-band from satellites to home-mounted dishes as small as eighteen inches in diameter. A similar development is occurring in the cellular telephone industry as efforts are being made to add video capability to cellular telephones.

A development waiting to happen is a system that allows a user to access information such as personal records from a remote location, anywhere, at any time and for any purpose. It is not uncommon nowadays for people to search frantically for medical records, passwords, addresses and telephone numbers. It would be nice to have quick access to these records. It would be even nicer to be able to access these records from any location, at any time.

An objective of the present invention is to provide such a system.

SUMMARY OF THE INVENTION

According to one broad aspect of the present invention, a personal interface system for a plurality of users comprises a plurality of portable computers equipped for wired and RF communications; and a plurality of base stations covering a geographical area. The base stations are operable to communicate with the portable computers within the geographical area over RF communication links. The system also comprises a database including computer memory for storing personal records of the users, a computer for accessing the personal records from the memory, modems for communicating with the portable computers over wired communication links, and a high speed distribution facility for communicating with the base stations.

DETAILED DESCRIPTION OF THE PREFERRED EMBODIMENT

Figure 1:
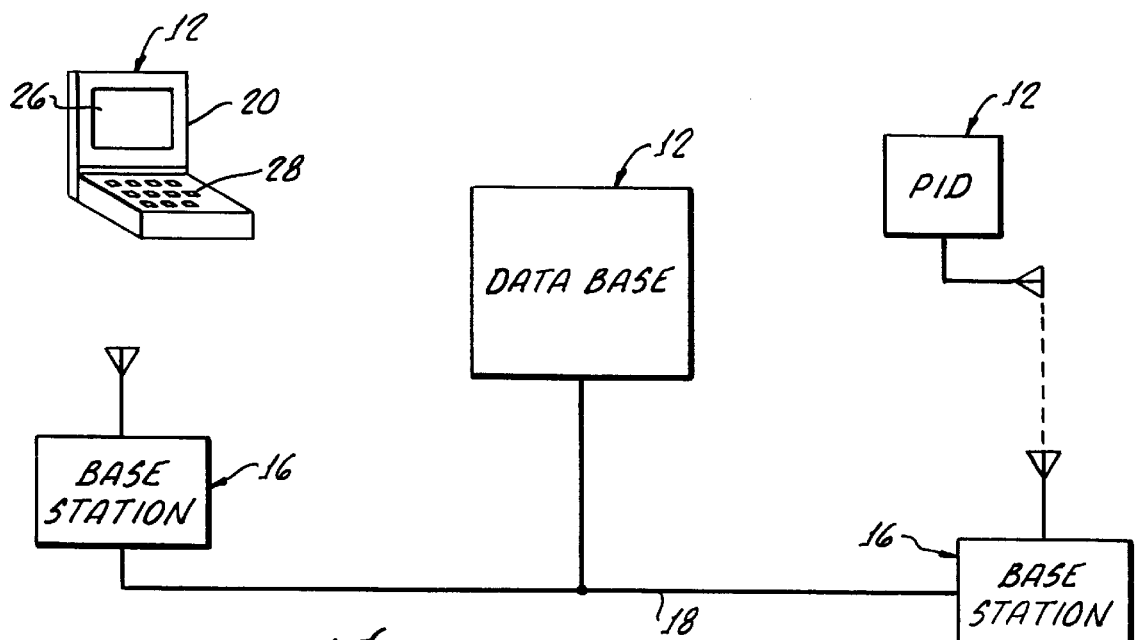
FIG. 1 is a block diagram of a personal communication system in accordance with the present invention.

FIG. 1 shows a personal communication system 10 including a plurality of personal interface devices 12 that communicate with a central database 14. The database 14 includes a plurality of personality modules, one for each person registered to access the database 14. Each personality module stores information such as medical records, passwords, addresses, telephone numbers and any other bits of information the registered user wishes to have stored. The central database 14 also provides access to other wireline and wireless networks, making available even greater amounts of information to the users. Additional types of information could include high fidelity audio, full-motion video and bitmaps, text files and other types of data. Additionally, the database 14 can be configured to provide on-line services, such as e-mail, access to the Internet and even access to financial institutions. The personal interface devices 12 have multimedia capability to display the audio and video.

The personal interface device 12 is equipped for wired and wireless communications. This allows it to access the database 14 from any remote location.

To accommodate the wireless communications, the system 10 includes a plurality of base stations 16. Each base station 16 communicates with all personal interface devices 12 in its cell site at radio frequencies. One frequency is used for transmission from the base station 16 to the personal interface device 12 (the "downlink" frequency), and a different frequency is used for transmission from the personal interface device 12 to the base station 16 (the "uplink" frequency). One or more frequencies are set aside for setting up a communication link or call between the base station 16 and a personal interface device 12.

The personal interface devices 12 share these frequencies either through a Time Division Multiple Access ("TDMA") technique or a Code Division Multiple Access ("CDMA") technique. The TDMA technique divides up the total bandwidth into a predetermined number of time slots, with each personal interface device 12 being allocated a specific time slot. One of the time slots contains an imbedded control channel. Each base station 16 continuously transmits time division multiplexed bit streams to the personal interface devices 12 on the downlink frequency, with each personal interface device 12 responding by transmitting bursts on the uplink frequency.

The CDMA technique, instead of dividing up the total bandwidth into time slots, spreads the signal of each personal interface device 12 across the entire bandwidth. Although each personal interface device 12 generally occupies the entire bandwidth designated by the base station 16, it utilizes only a portion of the power available to the base station 16. The information-bearing signal is multiplied by a high bandwidth, high frequency digital spreading signal, which expands the narrow bandwidth information-bearing signal into a broad spread signal covering the entire transmission bandwidth. The spreading signal uses quasi-orthogonal bit sequences of period Tc, referred to in the art as chips. The chip sequence causes the cross-correlation function between personal interface devices 12 to be small, in which event the personal interface devices 12 are quasi-orthogonal to each other. The chip sequence can be generated or chosen so that a predetermined or unique chip sequence is assigned to a specific personal interface device 12 during the call set up each time the personal interface device 12 starts a call.

Each base station 16 determines the received signal strength of each call in progress, and forwards this information to the central database 14. The central database 14 uses advanced processing technology to keep track of all calls between the personal interface devices 12 and base stations 16. The central database 14 also uses the signal strength information from each base station 16 to determine when a call should be "handed off" from the base station in one cell site to the base station in another cell site. Hand-off allows communication to be maintained with a personal interface device 12 as the personal interface devices 12 roam from cell site to cell site.

The base stations 16 are interlinked with the central database 14 via a high-speed, high capacity distribution facility 18 capable of transmitting full-motion video images. The facility could be a fiber optic network, a radio communication link, or a satellite link. The satellite link provides the highest system capacity.

The personal interface device 12 is a notebook computer 20 including a microprocessor 22, Random Access Memory (RAM) 24, a display 26 and a keyboard 28. The microprocessor 22 can be a "PENTIUM" processor, a RISC-based processor (e.g., MIPS, "PowerPC") or a more powerful processor. The notebook computer 20 also includes a hard disk drive, and a peripheral storage device such as a CD ROM drive. It further includes parallels and serial ports, and an internal modem 30 for wired communications. Lastly, the notebook computer 20 includes a PCMIA board 32 for wireless communications with the base stations 16.

Figure 2:
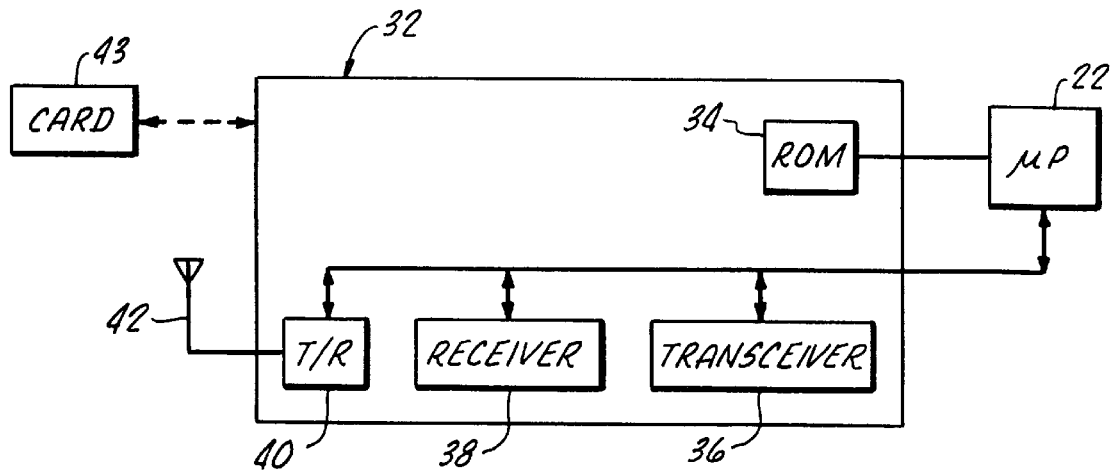
FIG. 2 is a block diagram of a PCMIA board for wireless communications.

Referring now to FIG. 2, the PCMIA board 32 includes a Read Only Memory (ROM) 34, transmitter 36, receiver 38, T/R module 40 and a high efficiency antenna 42. The ROM 34 stores an application program for the microprocessor 22. When programmed by the ROM 34, the microprocessor 22 defines and implements the protocol for the personal interface device 12. In an alternative embodiment, the application program could be stored on one of the computer's hard disk. This would eliminate the need for the ROM 34.

The protocol defines the convention through which the personal interface device 12 can communicate with the base stations 16 and, ultimately, the central database 14. The microprocessor 22 decodes the header of each base station transmission and executes a protocol structure which controls timing and decision making logic instructions (e.g., timing, message slot selection, T/R control) and other well known operations. Prior to a call setup, the subscriber unit 12 monitors air time, activity, account numbers, and protocol of the base station 14 to determine whether it can access the system 10. During call setup, a proximate base station 16 specifies the unique time slots and uplink/downlink frequencies for the interface device 12 to receive the transmission from the central database 14 and send requests to the central database 14.

RF signals received on the antenna 42 are sent to the receiver 38 through the T/R module 40. The receiver 38 separates the incoming signal into four demodulated signals: a compressed video signal, a compressed audio signal, a data signal and a transmission header. The transmission header is sent to the microprocessor 22. The compressed video signal, compressed audio signal and the data signal are unformatted. The compressed signals are then decompressed using compression rates embedded in the compressed signals. The decompressed signals, along with the unformatted data signal, are forwarded to the appropriate interfaces.

The decompressed audio signal can be reproduced over a speaker in the notebook computer 20. If the notebook computer 20 has an available PCMIA slot, the audio signal could be reproduced over a sound board. Data signals can be displayed, stored or transferred out of the notebook computer 20 through the serial or parallel port. Decompressed video signals received can be stored in memory or displayed on the flat panel display.

When displaying the video image, a dither or similar technique is used. This allows a reduction in the amount of video information necessary to display a quality image. The amount of video information is drastically reduced by limiting the bit length of the video to 8-bits and using a simulation technique to simulate the true colors of an image. Pixel words of 8-bit can display 256 colors simultaneously, and the simulation technique can be used to simulate many of the 16 million colors offered by 24-bit resolution.

Colors are simulated using a dither technique. The dither technique permits the simulation of intensity levels between quantized levels by permitting the eye to integrate fine detail within an area and record only the overall intensity of the area. Dithering aims to sacrifice some of an image's spatial resolution for an increase in perceived intensity resolution, accomplished by averaging the intensities of several neighboring pixels to simulate intensities that lie between quantization levels.

Any one of several types of dithering techniques can be used. "Ordered dither" relies on the eye's ability to blend the colors of adjacent pixels over small spatial areas so that an intermediate color is perceived. This approach focuses on replacing or mapping non-displayable colors (those not in the displayable color palette) within defined areas of the image to displayable colors to best simulate the true color when viewed by the human eye. The neighborhoods are chosen according to a two dimensional set of values, referred to as the dither table or dither matrix, which is tiled into the image's coordinate space. The values contained in the table are used to make decisions about which quantized intensity value will be output at each position, that is, should the intensity value be quantized to the quantized value above or below the original intensity value. The dither table values are different at each coordinate location such that when a constant input intensity is dithered over some area, the output values will alternate in some pattern between the upper and lower quantized intensity levels.

Hardware and software for displaying the video image using a dither technique is readily available.

In the past, the above techniques were used to reduce memory requirements of the display system. Here, however, the above techniques are used to reduce the number of transmitted video bits. In combination with data compression, the video information can be minimized, yet "true color" quality of the video image can still be maintained.

Transmission by the personal interface device 12 to the central database 14 requires a small bandwidth. The transmissions include commands and requests in response to menus. Most of the commands and responses could be entered with a single keystroke.

The transmission from the personal interface device 13 to the central database can also includes a request to increase video quality. Full-motion video, even when compressed, typically provides too much information to send over an RF bandwidth. Therefore, the user is faced with a tradeoff: high quality video versus high fidelity audio. The user cannot have both. Therefore, the user sends a request to increase one at the expense of the other. If the user desires a higher fidelity audio, an appropriate request is made to the central database 14.

This requires a protocol that is tailored for dynamic bandwidth allocation of video and audio signals. To implement this protocol, the request could include two bits representing four possible conditions: audio increase, video increase, no change in audio, and preset settings.

The commands and requests are formatted and transported, and further processed by the transmitter 36 into either a spread spectrum signal or a time division multiplexed signal, depending upon whether CDMA or TDMA is being used by the system 10. The encoded signal is used to modulate a carrier signal. The modulated carrier signal is sent to the antenna 42 through the T/R module 40.

The PCMIA board 32 includes a slot for accepting a smart card 43. The smart card 43 contains a unique code for identifying the registered user. The code is transmitted to the database 14 during logon. If the code on the smart card matches a code stored in the database, the user is granted access to the system 10. The code can also be used to gain access to financial institutions if the user wishes to conduct business transactions. Thus, the smart card provides a security feature for the system 10.

Figure 3:
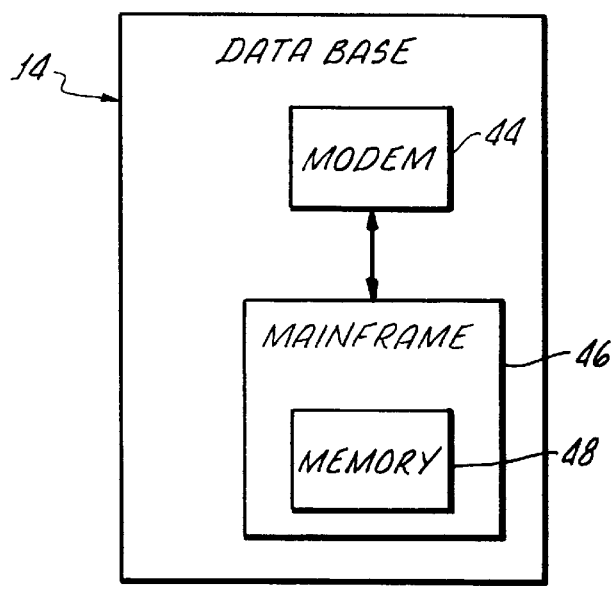
FIG. 3 is a block diagram of a central database, which forms a part of the system shown in FIG. 1.

FIG. 3 shows the central database 14, which includes a high speed modem 44 for communicating with the base stations over the high speed, high capacity distribution facility 18. The central database 14 also includes a mainframe computer 46 which communicates with the modem 44. The mainframe computer 46 also includes memory 48 for storing the personality modules of the users. When a user logs onto the mainframe computer 46, the mainframe computer 46 performs a ID verification, downloads billing information, and then downloads a menu to the user. The menu allows the user to choose the type of information desired. Thus, the user can access personal records such as medical history, telephone numbers and addresses through the appropriate selections on the menu.

The menu also gives the user access to audio files, video files and data files. These files can be stored in the mainframe computer 46, or they can be made available from other networks by the mainframe computer 46. The menu also gives the option to connect to on-line services such as e-mail, access to the Internet and access to financial institutions. These services could be provided directly by the mainframe computer 46, or they could be obtained by connecting to a vendor.

If a user selects a file so large that it cannot be transmitted with the RF bandwidth, the file is compressed. This is often the case with full-motion video. The mainframe computer 46 includes software for allocating the RF bandwidth among the audio and video signals that comprise the file. Bandwidth is allocated by varying the compression rates of the audio and video signals. The compression rates are dynamically varied to allow as much audio and video as possible to be transmitted within the RF bandwidth. When the audio compression rate is decreased, the bandwidth of the audio is increased and the bandwidth of the video is decreased. As a result, audio fidelity is improved and video quality is degraded. Conversely, when the audio compression rate is increased, the audio bandwidth is decreased and the video bandwidth is increased. This results in an improvement of the video quality and a degradation of the audio fidelity. The bandwidth is automatically allocated in response to the requests from the personal interface devices 12. The mainframe computer 46 constantly checks for requests received during the communication link with the personal interface device 12. When a request is received, the mainframe computer 46 determines the appropriate bandwidths.

Figure 4:
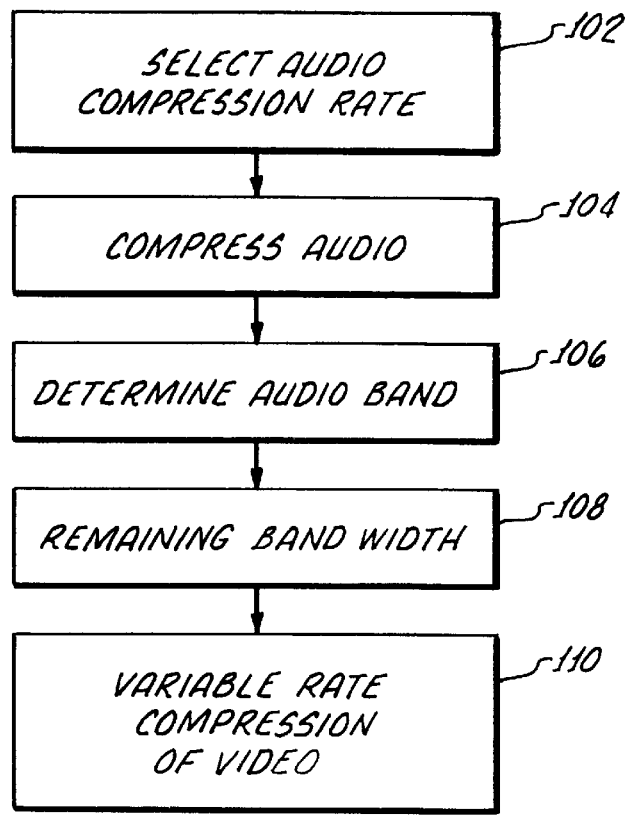
FIG. 4 is a flowchart of the steps executed by the computer for the dynamic allocation of the RF bandwidth.

FIG. 4 shows the steps executed by the mainframe computer 46 for the dynamic allocation of the RF bandwidth among the audio, video and data signals. A graduated scale of compression rates for audio are stored in the mainframe's memory. A compression rate for high fidelity audio is stored at one end of the scale, a rate for low sound fidelity (or even no audio) is stored at the other end of the scale, and intermediate rates are stored therebetween. A compression rate for audio is selected (step 102), and the audio signal is compressed (step 104). The bandwidth occupied by the compressed audio signal is determined (step 106), the remaining bandwidth available for the video and audio signals is determined (step 108), and the compression rate for the video signal is adjusted until the compressed video signal and data signal can fit into the remaining portion of the bandwidth (step 110). Selection of the audio compression rate is made by a user input. The remaining bandwidth for the video signal can be determined by subtracting the overall bandwidth from the bandwidth actually utilized by the audio signal. The video compression rates can then be adjusted by a control loop to fit the video within the remaining bandwidth. The control loop adjusts the video compression rate until the bandwidth actually utilized by the video signal is equal to the remaining bandwidth. The audio and video signals are compressed according algorithms that supports variable rate compression.

Apparatus and methods for compressing the audio and video signals are disclosed in U.S. Ser. No. 08/580,547 filed herewith now U.S. Pat. No. 5,784,572 and incorporated herein by reference. The apparatus supports variable rate compression and utilizes multiple compression algorithms. During a communication link, for example, the apparatus can use an MPEG-1 algorithm for both audio and video compression. During another communication link, the same apparatus can use an MPEG-2 algorithm for video compression and Dolby AC3 for audio compression.

Thus disclosed is a system that centralizes all information regarding the user. The system enables the user to create a single location for accessing personal records for any purpose. It also allows the user to access the information anywhere, at any time. And the user can access the system with a single device.

It is understood that the embodiments described herein are merely exemplary and that many modifications and variations of the present invention are possible in light of the above teachings. Therefore, the scope of the present invention is limited only by the appended claims.

We claim:

1. A personal communication system for a plurality of users, comprising:

a plurality of portable computers equipped for wired and RF communications;

a plurality of base stations covering a geographical area, the base stations being operable to communicate with the portable computers within the geographical area over RF communication links; and a database including computer memory for storing personal records of the users, a computer for accessing the personal records from the memory, modems for communicating with the portable computers over wired communication links, and a high speed distribution facility for communicating with the base stations.

2. The system of claim 1, wherein the high speed facility is a satellite link.

3. The system of claim 1, wherein the high speed facility is a fiber optic link.

4. The system of claim 1, wherein the portable computers are notebook computers.

5. The system of claim 4, wherein the notebook computer includes a board for providing the wireless communications, the board including a T/R module;

a receiver having an input coupled to the T/R module, the receiver being operable to receive compressed video and audio signals;

a transmitter having an output coupled to the T/R module; and a ROM for programming the microprocessor to decompress the audio and video signals received by the receiver.

6. The system of claim 5, wherein a dither technique is utilized to display the video signal, whereby the displayed video signal is compressed prior to transmission and dithered after transmission.

7. The system of claim 1, wherein the computer memory includes a plurality of user modules containing the records and other information, wherein the information is stored as audio, video and data signals, and wherein the computer of the database includes a processing unit for compressing the signals for transmission by the modem.

8. The system of claim 7, wherein the compression performed by the processing unit at variable rates to fit the audio, data and video signals within a fixed RF bandwidth.

9. The system of claim 8, wherein the RF bandwidth is divided into a video bandwidth and an audio bandwidth, and wherein the processing unit performs the steps of:

selecting an audio compression rate for compressing the audio;

determining the remaining bandwidth for the video; and compressing the video signal to fit within the remaining bandwidth.

10. The system of claim 1, wherein the computer of the database provides on-line services.

11. The system of claim 1, further comprising a smart card for each portable computer, the smart card including a unique code for gaining access to the system.

12. The system of claim 1, wherein the portable computers communicate with the base stations using a Time Division Multiple Access technique.

13. The system of claim 1, wherein the portable computers communicate with the base stations using a Code Division Multiple Access technique.

14. The system of claim 1, wherein the database sends video and audio signals to the database, wherein the portable computers send requests to the database to change the qualities of the signals, and wherein the database changes the quality in response to the requests.

15. The system of claim 1, wherein the database changes the quality by varying the rates of compression of the signals prior to transmission.

16. The system of claim 1, wherein said database includes:

at least one modem operable to transmit and receive video and audio signals within a fixed bandwidth; and a mainframe computer including memory for storing a plurality of user records and other information, said user records and other information being stored as audio, video and data signals; and a processing unit compressing the signals for transmission by the modem, said processing unit performing said compression at variable rates to fit the audio, data and video signals within said fixed bandwidth.

17. The system of claim 16, wherein said fixed bandwidth includes an RF bandwidth, and said RF bandwidth is divided into a video bandwidth and an audio bandwidth, and wherein the processing unit performs the steps of:

selecting an audio compression rate for compressing the audio signals;

determining the remaining portion of said RF bandwidth which is available for use to transmit video signals; and compressing the video signals to fit within the remaining portion of said RF bandwidth.

18. The system of claim 16, wherein the mainframe computer is programmed to also provide on-line services.

19. The system of claim 1 wherein said plurality of portable computers includes:

a notebook computer including a microprocessor;

a wireless communication board mounted inside the notebook computer and electrically coupled to the microprocessor, the wireless communication board including:

a TIR module;

a receiver having an input coupled to the T/R module, the receiver being operable to receive compressed video and audio signals from said database via at least one of said base stations;

a transmitter having an output coupled to the T/R module; and at least one ROM for programming the microprocessor to decompress the audio and video signals received by the receiver.

20. The system of claim 19, wherein a dither technique is utilized to display the video signal, whereby the displayed video signal is compressed prior to transmission and dithered after transmission.

* * * * *